United States Patent [19]

Hashimoto et al.

[11] 4,173,059

[45] Nov. 6, 1979

[54] DEVICE FOR TIGHTENING BOLTS

[75] Inventors: Hiroshi Hashimoto; Kinya Mori, both of Nishikasugai, Japan

[73] Assignee: Sanyo Machine Works, Ltd., Aichi, Japan

[21] Appl. No.: 895,398

[22] Filed: Apr. 11, 1978

Related U.S. Application Data

[62] Division of Ser. No. 642,706, Dec. 22, 1975, Pat. No. 4,095,325.

[30] Foreign Application Priority Data

| | | | |
|---|---|---|---|
| Dec. 24, 1974 | [JP] | Japan | 50/3163 |
| Oct. 13, 1975 | [JP] | Japan | 50/123449 |
| Oct. 13, 1975 | [JP] | Japan | 50/123450 |
| Oct. 13, 1975 | [JP] | Japan | 50/123451 |
| Oct. 14, 1975 | [JP] | Japan | 50/124025 |
| Oct. 14, 1975 | [JP] | Japan | 50/124026 |

[51] Int. Cl.[2] .......................... B23P 19/04; B25B 23/147

[52] U.S. Cl. .......................... 29/240; 81/52.4 R; 81/52.5

[58] Field of Search .................. 29/407, 428, 446, 526, 29/240; 81/52.4 R, 52.5

[56] References Cited

U.S. PATENT DOCUMENTS

| | | | |
|---|---|---|---|
| 2,691,314 | 10/1954 | Stevens et al. | 81/52.4 R |
| 2,720,803 | 10/1955 | Rice et al. | 81/52.4 R |
| 2,893,278 | 7/1959 | Rice | 81/52.4 R |
| 2,951,389 | 9/1960 | Wille | 81/52.4 R X |
| 3,454,111 | 7/1969 | Niess | 81/52.4 R X |
| 3,827,506 | 8/1974 | Himmelstein et al. | 81/52.5 X |
| 3,965,778 | 6/1976 | Aspers et al. | 81/52.4 R |
| 3,969,810 | 7/1976 | Pagano | 29/407 |

*Primary Examiner*—E. M. Combs
*Attorney, Agent, or Firm*—Hall & Houghton

[57] ABSTRACT

There are disclosed a method and device for tightening bolts, characterized by including drive means, detection means and control means whereby a bolt (or nut) is turned at high speed until it comes in contact with the tightening bearing surface of a member to be clamped (such as a plate), whereupon it is turned at low speed through a predetermined angle until it is stopped at a predetermined tightening completion position.

4 Claims, 9 Drawing Figures

DEVICE FOR TIGHTENING BOLTS

This is a division, of application Ser. No. 642,706, filed Dec. 22, 1975, now U.S. Pat. No. 4,095,325, granted on June 20, 1978.

BACKGROUND OF THE INVENTION (a) Field of the Invention

The present invention relates to a method and a device for automatically tightening bolts (or nuts) under optimum conditions.

(b) Description of the Prior Art

As for tightening of bolts, the torque method and the rotative angle method have heretofore been generally known.

The torque method, which is based on the assumption that the axial force on the bolt is proportional to the torque required to turn the bolt, is adapted to continuously detect the torque so as to control the tightening due to the axial force on the bolt.

However, the proportional relationship between the axial force on the bolt and the torque considerably changes owing to other factors than the bolt such as the characteristics of the tightening tool and variations in the friction coefficient between the bolt and the member to be clamped due to deposition of dirt or oil. Therefore, such axial force varies from bolt to bolt and it is difficult to obtain a predetermined axial force.

It is the above mentioned rotative angle method which has improved the torque method. Thus, it makes use of the fact that the amount of elongation of the belt is proportional to the angle through which the bolt is turned. According to said second method, the bolt is turned through a fixed predetermined angle after bolt head comes in contact with the tightening bearing surface of a member to be clamped, in order to reduce variations in the axial force on the bolt proportional to the elongation of the bolt.

Even with this method, however, since it is very difficult to ascertain whether or not the bolt comes in accurate contact with the tightening bearing surface of the member to be clamped, the usual practice is to detect the time when about $\frac{1}{3}$ of the tightening completion torque is reached (which is referred to as the snug point), followed by further turning of the bolt through a fixed angle to complete the tightening.

Further, the tightening tools generally used in carrying out said methods comprise a motor to turn a bolt at high speed to reduce the tightening operation time. With such high speed rotation of the motor, however, even if a stop signal indicating the completion of tightening is given, the inertia of the motor shaft prevents instantaneous stoppage of the operation, resulting in the disadvantage of the bolt being over-tightened. In this case, the idea might be conceived of giving a stop signal to the motor a little earlier in consideration of the inertia of the motor shaft. Even with such a measure taken, however, it is difficult to obtain the desirable tightening force, since such error-producing factors as variations in the frictional resistance of the tightening bearing surface and in the motor rpm are invloved.

SUMMARY OF THE INVENTION

The present invention has for its object to provide improvements in a method and device for tightening bolts.

Particularly, the invention has for its object to accurately reproduce the desired bolt tightening completion condition.

Further, the invention provides a method which enables the operation to be carried out accurately and quickly.

In order to achieve these objects, the invention effects bolt tightening operation in such a manner that the operation starts with turning the bolt at high speed and in course of the operation the rotative speed of the bolt is switched to a low speed so as to obtain a fixed tightening completion condition.

Such switching of the rotative speed of a bolt to a low speed in course of the operation is effective to reduce overrun due to the inertia force when the rotation of the bolt is to be stopped at the tightening completion point. In addition, if the operation is started with low speed rotation, the rotation could be stopped accurately at the tightening completion point, but this would extremely prolong the operation time.

Said switching from high to low speed rotation is effected by detection of the torque exerted on the rotary shaft or detection of the forwardly moved position of the bolt or by means of a timer. In this case, if an electric (dc) motor is used as a rotative drive source in connection with detection of the torque, the torque detected can be expressed in terms of an electric current by making use of the fact that current is proportional to torque.

The present invention provides various methods of accurately stopping the rotation after the rotative speed is switched as described above.

One of the methods is to turn a bolt through a fixed angle from the snug point (after which point the elongation of the bolt is proportional to the angle through which it is turned). Another is to detect the tightening completion point in terms of torque. In the former method, in order to determine the tightening completion point more accurately, the snug point is detected during low speed rotation. Concrete examples of such methods will be later described. To be brief, in one method, the snug point is detected in terms of torque. More particularly, a touch point is once detected during high speed rotation, whereupon some amount of reverse rotation is effected at low speed in consideration of overrun incidental to high speed rotation and then forward rotation is effected at low speed, in course of which the snug point is detected and thenceforth low speed rotation through a fixed angle is effected to reach the tightening completion point. In another method, the switching point from high to low speed rotation is somewhat short of the touch point. This is made possible either by setting it by means of a timer or by detecting a position just short of the touch point, i.e., a position just prior to the bolt coming in contact with the tightening bearing surface, by reference to the forwardly moved position of the bolt.

Once the snug point is detected during low speed rotation in the manner described above, the tightening completion point can be easily made fixed by low speed rotation through a fixed angle from the snug point.

Further, in the case of a method of detecting the tightening completion point in terms of torque, the tightening completion point can be easily made fixed by incorporating a method of detecting the time when switching from high to low speed rotation is made, in terms of a torque exerted when the touch point is reached.

Further, the present invention is arranged so that a bolt is tightened beyond its yield point according to the rotative angle method, whereupon the bolt is turned in the reverse direction through a fixed angle at low speed, thereby obtaining the proper tightening force.

The invention will now be described in more detail with reference to concrete examples thereof shown in the accompanying drawings.

DESCRIPTION OF THE PREFERRED EMBODIMENTS

Figure 1:
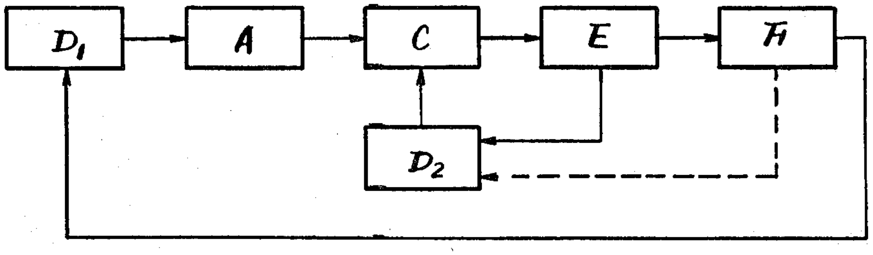
FIG. 1 is a block diagram showing the outline of a device according to the present invention.
Figure 2:
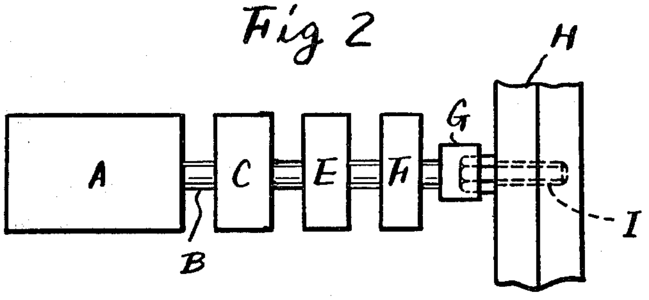
FIG. 2 is a schematic side view of the device.

According to the present invention, as shown in FIGS. 1 and 2, the motor A of a tightening machine rotating at high speed and a speed change unit C connected directly to the rotary shaft B of said motor A are given control instructions by control sections D1 and D2 in accordance with output signals from a torque detector E and rotative angle detector F so as to effect bolt tightening operation on the basis of the rotative angle method. Connected directly to the motor output shaft B are the speed change unit C, torque detector E, rotative angle detector F and spanner head G.

In FIG. 2, H designates a member to be clamped (plate or the like) and I designates a bolt.

Bolt tightening operation by the above described tightening machine is carried out in the following manner.

First of all, the front end of the bolt I is lightly screwed into a bolt hole in the member H by hand and the spanner head G is then fitted over the bolt head. In this case, if the spanner head G has the function of firmly gripping the bolt head when simply fitted over the bolt head, then there is no need to manually acrew the bolt into the bolt hole in the member H in advance.

The spanner head G thus fitted over the bolt head is then rotated at high speed by the motor A to screw the bolt into the bolt hole in the member H, and when the magnitude of the torque reaches a predetermined value, this is detected by the torque detector E, which causes the control section D2 to give instructions to the speed change unit C to change the speed from high to low value, so that the speed change unit C is rotated at low speed, the angle through which the motor is rotated at this low speed being detected by the rotative angle detector F. When a predetermined rotative angle is reached, the detector F gives the control sections D1 and D2 instructions to stop the motor A and simultaneously restore the speed change unit C to the high speed side.

Tightening of another bolt may be effected by repeating the operation described above.

From the above description, it will be understood that bolts can be tightened with the proper tightening force at all times.

Figure 3:
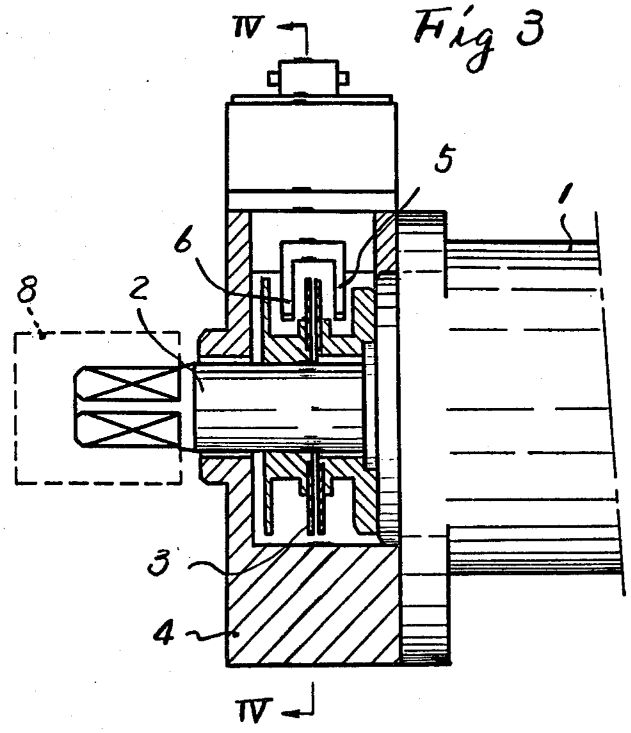
FIG. 3 is a more detailed side view showing the principal portions of the present device.
Figure 4:
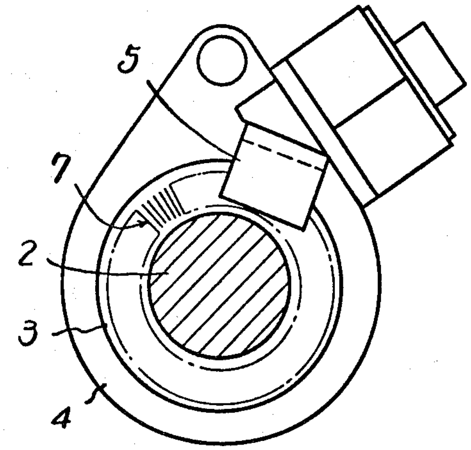
FIG. 4 is a front view taken in the direction of the line IV—IV of FIG. 3.

FIGS. 3 and 4 illustrate a concrete example of a tightening device, wherein 1 designates a motor; 2, the motor shaft; and 3 designates a slitted disc fixed to said motor shaft 2. In this concrete example, the rotative angle detector is in the form of an optical encoder 4 comprising a rotative angle detecting section constituted by a set of a light emitter 5 and a light receiving element 6 opposed to each other and disposed on either side of the slitted disc 3, which is provided with angularly equispaced slits 7, the arrangement being such that a ray of light from the light emitter 5 disposed on one side of the slitted disc 3 is received by the light receiving element 6 disposed on the other side of the slitted disc 3. Therefore, when the slitted disc 3 is rotated, a ray of light emitted from the light emitter 5 toward the light receiving element 6 is intermittently received by the latter. The output signal from the light receiving element 6 is processed through an amplifier circuit, a shaping circuit, etc. to provide a pulse signal, which is then plus-minus discriminated by a plus-minus discriminating circuit and counted by a counter to indicate the rotative angle.

Further, in the above concrete example, the torque detector is arranged in the following manner.

A dc motor is used as the motor 1. The dc motor has a characteristic such that its current is proportional to its torque. By making use of this characteristic, the torque is detected by detecting the current.

In addition, the use of an ac series-wound commutator motor instead of said dc motor also enables similar torque detection.

The bolt tightening machine in the above concrete example makes torque detection by the current through the motor 1 in such a manner that when the torque reaches about ⅓ of the tightening completion torque (or the snug point), the voltage across the motor 1 is reduced to reduce the rpm, while the optical encoder 4 counts the number of pulses until a value corresponding to a predetermined angle is reached, whereupon the rotation of the motor 1 is stopped. Since rotative speed of the tightening machine just prior to the stoppage has been reduced to about 10 rpm, instantaneous stoppage is achieved without overrun due to inertia force, so that bolt tightening with high accuracy is assured. In addition, in FIG. 3, 8 designates a socket box.

Instead of the optical encoder 4 in the above concrete example, Sony Magnescale (trade name) or other suitable rotative angle detectors may be used.

In the above concrete example, in order to more accurately determine the axial force on the bolt upon completion of bolt tightening operation, it is desirable to detect the snug point during low speed rotation. To realize this, the following methods are advisable.

One of the methods is by rotating the bolt at high speed until a point of time for touch is reached, whereupon the bolt is slightly rotated in the reverse direction, followed by rotation in the forward direction at low speed during which the bolt is allowed to pass by the snug point. The bolt is rotated at low speed through a fixed angle from the snug point, to complete the tightening operation.

By the point of time for touch is meant a point of time when the bolt head comes in contact with the tightening bearing surface of the member to be clamped.

Figure 5:
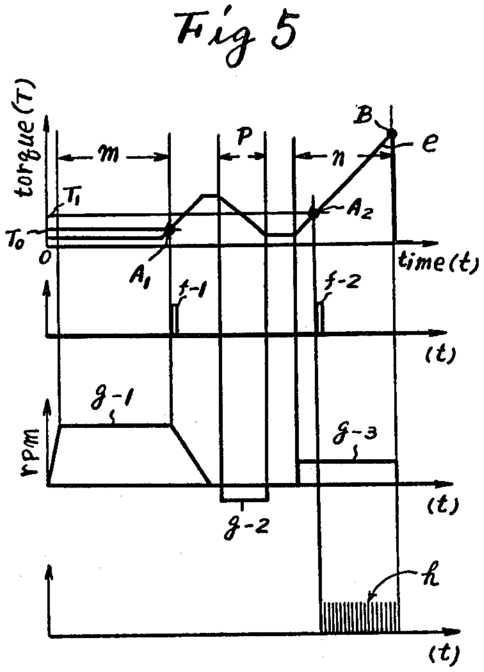
FIG. 5 is an output vs. time graph showing some control characteristics of the bolt tightening method of the present invention.

Changes in torque T with time in the above method are as shown by a curve e in FIG. 5, wherein a point A1 designates the point of time for touch; a point A2, the snug point; and a point B desigantes the tightening completion point. Detection of the point A1 is effected by a torque detector. Thus, the torque which will be exerted when the bolt head comes in contact with the tightening bearing surface of the member to be clamped is predetermined. The bolt is screwed into the bolt hole in the member at high speed, and when the torque exerted becomes equal to said present torque, the rotation of the motor is stopped. The torque at the point A1 is indicated at T0 in FIG. 5. When the torque detector detects said T0, a pulse signal f-1 is emitted, whereby the rotation of the motor is stopped. When the rotation of the motor is completely stopped, the motor is rotated in the reverse direction. In a region m from the start of the bolt tightening operation to the point A1, the motor is rotated at high speed as shown at g-1. The emission of the pulse signal f-1 stops the rotation of the motor, but at this time, since the motor has inertia due to its high speed rotation, it is rotated a little too much before it is stopped. As a result, the torque exceeds the point A1. The motor is then rotated in the reverse direction at low speed g-2 in a region P. This reverse rotation reduces the torque and the motor is stopped in the vicinity of T0 and is then rotated in the forward direction at low speed g-3 through a region n. In this case, after detection of the point A1, the start and stoppage of the reverse rotation and the start and stoppage of the low speed forward rotation may be present by a timer or the like. Further, the amount of reverse rotation may be detected by utilizing an angle detector so as to find the excess angle beyond the point A1, and this excess angle alone or plus something may be controlled.

During said low speed forward rotation, the snug point A2 is detected. This detection is also effected by the torque detector. That is, the torque T1 at the snug point is preset to about ⅓ of the tightening completion torque. And upon detection of the troque T1, a pulse signal f-2 is emitted, thereby actuating the rotative angle detector. After the point A2 is reached, the bolt is tightened by an amount corresponding to the preset angle to complete the tightening. In this way, tightening with high accuracy is made possible. Thus, the pulse signal f-2 at the point A2 causes a rotative angle detector; e.g., an optical encoder, to begin counting, using pulses such as those shown at h in FIG. 5, and when the preset number of pulses is reached, the rotation of the motor is stopped.

Figure 6:
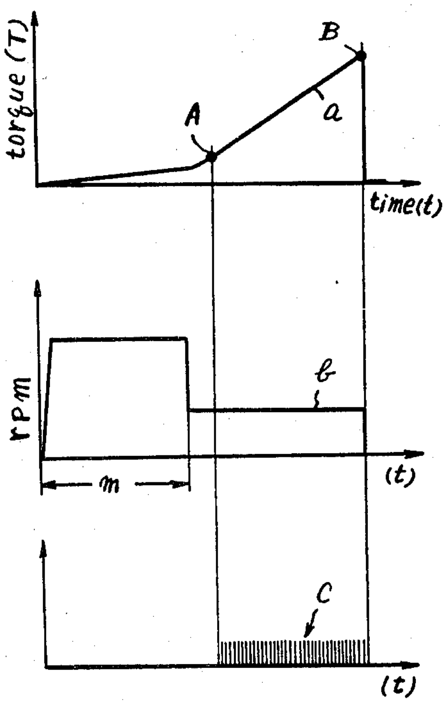
FIG. 6 is an output vs. time graph showing other control characteristics of the bolt tightening method of the present invention.

The other method of detecting the snug point at low speed is illustrated in FIG. 6, wherein the time m for imparting high speed rotation to the bolt is set by a timer. In this case, however, the setting of the time m is such that switching from high to low speed is effected a little short of the snug point A.

With this arrangement, the snug point A is detected at low speed, and if the bolt is turned through a fixed angle from the point A by help of a rotative angle detector, it is possible to ensure that the axial force on the bolt, i.e., bolt tightening force, is equal to the predetermined value.

Changes in the torque T with time during the bolt tightening operation according to the above described method are as shown by a curve a; changes in the motor rpm with time are as shown by b; and the manner of the rotative angle detector counting the number of pulses is shown by c. Further, a point B on the curve a indicates the tightening completion point. The value of torque T0 at the snug point A is set to about ⅓ of the tightening completion torque.

In the methods described so far, the rotation to be imparted to the bolt is at high speed in the first stage and slowed down in the middle stage and after the snug point is reached the rotative angle method is employed to impart a tightening force with high accuracy to the bolt. The present invention, however, may also be embodied in the following manner.

Switching from high to low speed is effected at the touch point, and the tightening completion point is set in terms of torque. In the case where an electric motor is used, the detection of torque is effected by detecting motor current with a detector by making use of the fact that torque and current are in correspondence relationship, as described above. It is, of course, possible to directly detect torque, but in that case, a torque detector is required. As compared therewith, the detection of torque in terms of current has the advantage that there is no need to provide such torque detector, as described above.

Figure 7:
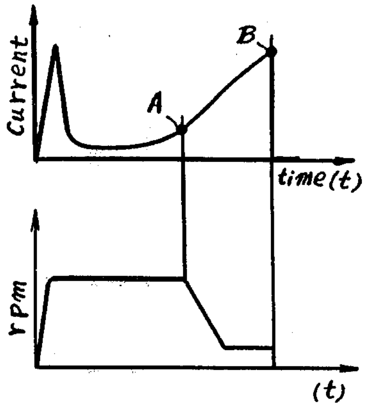
FIG. 7 is an output vs. time graph showing still other control characteristics of the bolt tightening method of the present invention.

FIG. 7 shows changes in the motor current and rpm in the above described method. In this Figure, a point A designates the touch point and a point B designates the tightening completion point.

The points A and B are set in the manner described above.

Another method of tightening bolts according to the present invention will now be described.

In this method, the bolt is further tightened from the yield point until a region is reached where the tightening force is no longer proportional to the elongation of the bolt, whereupon the bolt is turned through a fixed angle in the reverse direction, thereby obtaining the proper tightening force.

Figure 8:
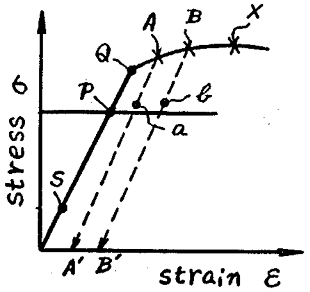
FIG. 8 is a stress vs. strain graph showing another control method in the bolt tightening method of the present invention.

The relationship between stress $\sigma$ and strain $\epsilon$ in, e.g., a high tensile strength bolt is shown in FIG. 8, in which a point O on the solid line curve is the so-called touch point of the bolt, until which no stress $\sigma$ or strain $\epsilon$ appears owing to the absence of sufficient intimacy between the bolt and the member to be clamped. As the bolt is tightened from this point O, the stress $\sigma$ and strain $\epsilon$ are increased approximately proportionally until a point P is reached which corresponds to about 80% (which figure differs according to the place where the bolt is tightened) of the yied point. The stress $\sigma$ 1 at this point P corresponds to the optimum tightening force and it is desirable to stop the tightening. If the bolt is further tightened from the yield point Q, the rate of increase of stress $\sigma$ becomes gentle and at last the maximum tensile strength point X is reached where any further tightening will break the material. Therefore, even after the tightening proceeds to the maximum tensile strength point X, if the stress is brought back again to $\sigma$ 1 or thereabouts, the tightening becomes effective.

Figure 9:
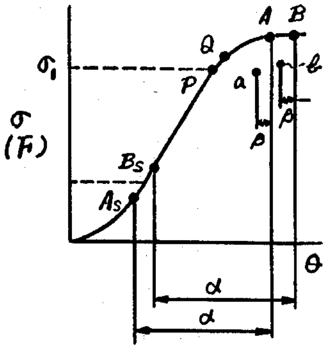
FIG. 9 is a graph in which the relationship shown in FIG. 8 is shown as the stress corresponding to the angle through which the bolt is turned.

Thus, the present invention, using the rotative angle method, is intended to turn the bolt through a fixed angle in the reverse direction after the bolt is tightened to a region between A and B, to thereby obtain the optimum tightening force. FIG. 9 shows the principles of the method, showing tensile stress in (or tightening force on) a bolt relative to tightening angle. The snug point is detected during high or low speed operation and the bolt is turned through a fixed angle, but the tightening force varies between points As and Bs owing to errors in torque detection or variations in coefficient of friction. If, however, the bolt is turned through a fixed angle from the point As or Ab to be tightened to its plastic range, it will reach the point A or B. At the points A and B the increase of tensile stress relative to the tightening rotative angle, i.e., the elongation of the bolt is gentle, so that the difference between the tightening forces at these points A and B is small. Therefore, if the bolt is turned back through a fixed angle $\beta$ from the point A or B, a permanent strain will result, and a tightening force with the same tightening accuracy as at the point A or B is obtained with a stress approximating to the optimum stress $\sigma 1$.

What is claimed is:

1. Apparatus for tightening a bolt to a member to be clamped by the rotative angle method comprising electric motor means, said motor means so constructed that the current generated thereby is proportional to the torque of said motor means, shaft means connected at one end to said motor means for rotation thereby and the opposite end adapted to receive bolt engaging means, speed change means operatively positioned to said motor for switching the rotative speed of said shaft means from high to low speed at a predetermined point of time during the tightening of a bolt, torque detector means operatively associated with said motor for detecting the current generated by the said motor and thereby determining the torque exerted on the shaft means of said motor means, and rotative angle detector means for rotating the bolt to be tightened through a fixed angle from a predetermined point of time and then stopping the rotation of the shaft means of said motor means whereby, upon detection of the predetermined torque by said torque detector means, the speed change means will be actuated along with said rotative angle detector means to change the speed of rotation of said shaft means from high to low and then to a stop position upon the completion of the tightening of the bolt.

2. Apparatus for tightening a bolt to a member to be clamped in accordance with claim 1, wherein said rotative angle detector means comprise optical encoder means mounted on the shaft means intermediate its ends thereof.

3. Apparatus for tightening a bolt to a member to be clamped in accordance with claim 2, wherein the optical encoder means include slitted disk means mounted on said shaft means for rotation thereon, light emitting means and light receiving means operatively positioned on opposite sides respectively of said slitted disk means whereby the light passing from the light emitting means to the light receiving means will be intermittently interrupted, circuit means electrically coupled with said light receiving source means for providing a pulse signal therefrom, plus-minus discriminating circuit means for receiving said pulse signal for discriminating same and counter means for counting said discriminator pulse signal to indicate the rotative angle.

4. Apparatus for tightening a bolt to a member to be clamped in accordance with claim 1, wherein said motor means is a dc motor.

* * * * *